US009193072B2

(12) United States Patent
Kim et al.

(10) Patent No.: US 9,193,072 B2
(45) Date of Patent: Nov. 24, 2015

(54) ROBOT AND CONTROL METHOD THEREOF

(75) Inventors: Myung Hee Kim, Suwon-si (KR); Kyung Shik Roh, Seongnam-si (KR); Young Bo Shim, Seoul (KR); San Lim, Suwon-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 491 days.

(21) Appl. No.: 13/232,374

(22) Filed: Sep. 14, 2011

(65) Prior Publication Data

US 2012/0072022 A1   Mar. 22, 2012

(30) Foreign Application Priority Data

Sep. 20, 2010   (KR) .................. 10-2010-0092238

(51) Int. Cl.
*B25J 9/16*   (2006.01)

(52) U.S. Cl.
CPC .............. *B25J 9/1679* (2013.01); *B25J 9/1612* (2013.01); *B25J 9/1666* (2013.01); *G05B 2219/39113* (2013.01); *G05B 2219/39473* (2013.01); *G05B 2219/39474* (2013.01); *G05B 2219/39542* (2013.01)

(58) Field of Classification Search
CPC .......... G05B 2219/39113; G05B 2219/39473; G05B 2219/39474; G05B 2219/39475; G05B 2219/39484; G05B 2219/39536; G05B 2219/39542; G05B 2219/39543; G05B 2219/39544; G05B 2219/39545; B25J 9/1612; B25J 9/1664; B25J 9/1666; B25J 9/1669
See application file for complete search history.

(56) References Cited

U.S. PATENT DOCUMENTS

| 5,579,442 | A  | * | 11/1996 | Kimoto et al. ............... 700/246 |
| 7,474,939 | B2 | * | 1/2009  | Oda et al. .................... 700/245 |
| 8,472,698 | B2 | * | 6/2013  | Agrawal et al. .............. 382/153 |
| 2006/0012198 | A1 | * | 1/2006 | Hager et al. ................. 294/106 |
| 2009/0096790 | A1 | * | 4/2009 | Wiedemann et al. ......... 345/427 |
| 2009/0285664 | A1 | * | 11/2009 | Kim et al. .................... 414/730 |
| 2010/0138039 | A1 | * | 6/2010 | Moon et al. .................. 700/245 |
| 2010/0168950 | A1 | * | 7/2010 | Nagano ......................... 701/25 |
| 2010/0256818 | A1 | * | 10/2010 | Aoba et al. ................... 700/275 |
| 2011/0071675 | A1 | * | 3/2011 | Wells et al. .................. 700/250 |

OTHER PUBLICATIONS

Al-Gallaf, E. A. "Multi-fingered robot hand optimal task force distribution: Neural inverse kinematics approach." Robotics and Autonomous Systems 54.1 (2006): 34-51.*
Miller, et al. "Automatic grasp planning using shape primitives." Robotics and Automation, 2003. Proceedings. ICRA'03. IEEE International Conference on. vol. 2. IEEE, 2003, p. 1824-1829.*

\* cited by examiner

*Primary Examiner* — Thomas G Black
*Assistant Examiner* — Ce Li
(74) *Attorney, Agent, or Firm* — Harness, Dickey & Pierce, P.L.C.

(57) ABSTRACT

A robot and a control method thereof. The robot has plural robot arms, each having at least one joint unit and a hand, and the control method includes calculating in advance and storing a plurality of grasp poses to generate grasp routes, sensing respective orientations of an object, the robot arms, and an obstacle, selecting one grasp pose from among the plurality of grasp poses by judging a movable angle range of the at least one joint unit, whether or not the object collides with the obstacle, and self-collision between the robot hands based on the sensed respective orientations, and generating grasp routes using the selected grasp pose. In the control method, the plurality of feasible grasp poses is calculated in advance and then stored, thereby rapidly and stably performing grasping of the object.

8 Claims, 7 Drawing Sheets

ROBOT AND CONTROL METHOD THEREOF

CROSS-REFERENCE TO RELATED APPLICATIONS

This application claims the benefit of Korean Patent Application No. 2010-0092238, filed on Sep. 20, 2010 in the Korean Intellectual Property Office, the disclosure of which is incorporated herein by reference.

BACKGROUND

1. Field

Embodiments relate to a robot, which naturally and stably grasps an object, and a control method thereof.

2. Description of the Related Art

In general, machinery which performs motions similar to those of a human using an electric or magnetic action is referred to as a robot. Robots at the early stage were industrial robots, such as manipulators or transfer robots, which performed dangerous work, simple repeated work, and work requiring great strength in place of humans for the purpose of work automation or unmanned work on industrial lines. Recently, research and development of humanoid robots which have an external appearance similar to that of humans and coexist in working and living spaces of humans to provide various services is progressing.

Such a humanoid robot is provided with robot hands to grasp an object so as to achieve interchange and cooperation with humans in daily life, and the robot hand includes a plurality of fingers and a palm similar to a human hand. The robot hand adjusts stiffness of tips of the fingers through impedance control, thus achieving both precise work and flexible and stable work.

In a conventional robot grasp control method, the Inverse kinematic equation is solved whenever grasping is performed, and if a solution to the Inverse kinematic equation is not obtained, it takes a long time to generate grasp routes. Further, an alignment criterion of grasp poses, calculated by solving the Inverse kinematic equation, is inadequate and thus unnatural grasping may be performed.

SUMMARY

Therefore, it is an aspect of one or more embodiments to provide a robot and a control method thereof in which grasp poses are calculated in advance and then stored and one of the stored grasp poses stored is selected according to orientations of a sensed object, robot arms, and an obstacle.

Additional aspects of one or more embodiments will be set forth in part in the description which follows and, in part, will be obvious from the description, or may be learned by practice of the embodiments.

In accordance with an aspect of one or more embodiments, a control method of a robot with a plurality of robot arms, each of which has at least one joint unit and a hand, includes calculating in advance and storing a plurality of grasp poses to generate grasp routes, sensing respective orientations of an object, the plurality of robot arms, and an obstacle, selecting one grasp pose from among the plurality of grasp poses by judging a movable angle range of the at least one joint unit, whether or not the object collides with the obstacle, and self-collision between the robot hands based on the sensed respective orientations, and generating grasp routes using the selected grasp pose.

The calculation and storage of the plurality of grasp poses may include setting and storing a plurality of predetermined virtual orientations of the object, locating the object at the plurality of stored virtual orientations, calculating the plurality of grasp poses at each of the plurality of virtual orientations by calculating solutions to the Inverse kinematic equation to the plurality of robot arms to grasp the object located at the virtual positions, and aligning the plurality of calculated grasp poses in order of naturalness in grasping.

The calculation of the plurality of grasp poses may includes calculating a solution to the Inverse kinematic equation to one robot arm among the plurality of robot arms, and fixing the one robot arm and calculating a solution to the Inverse kinematic equation to the remaining robot arm, after the calculation of the solution to the Inverse kinematic equation to the one robot arm.

In the alignment of the plurality of grasp poses, the plurality of grasp poses may be aligned in order of naturalness in grasping in consideration of a distance between the object and the at least one joint unit and a rotation angle of the at least one joint unit.

A grasp pose, having a shorter distance between the object and the at least one joint unit and a smaller rotation angle of the at least one joint unit, may be judged to represent more natural grasping of the object.

In accordance with another aspect of one or more embodiments, a robot with a plurality of robot arms, each of which has at least one joint unit and a hand, includes a memory unit to set and to store a plurality of predetermined virtual orientations of an object, a grasp pose calculation unit to calculate in advance and to store a plurality of grasp poses using the plurality of virtual orientations stored in the memory unit, an alignment unit to align the plurality of grasp poses calculated by the grasp pose calculation unit in order of naturalness in grasping and to store the plurality of aligned grasp poses in the memory unit, a sensing unit to sense respective orientations of the object, the plurality of robot arms, and an obstacle, and a grasp route generation unit to select one grasp pose from among the plurality of grasp poses by judging a movable angle range of the at least one joint unit, whether or not the object collides with the obstacle and self-collision between the robot hands based on the sensed respective orientations, and to generate grasp routes using the selected grasp pose.

The grasp pose calculation unit may locate the object at the plurality of virtual orientations, and calculate the plurality of grasp poses at each of the plurality of virtual orientations by calculating solutions to the Inverse kinematic equation to the plurality of robot arms to grasp the object located at the virtual positions.

The grasp pose calculation unit may calculate a solution to the Inverse kinematic equation to one robot arm among the plurality of robot arms, and fix the one robot arm and calculates a solution to the Inverse kinematic equation to the remaining robot arm, after the calculation of the solution to the Inverse kinematic equation to the one robot arm.

The alignment unit may align the plurality of grasp poses in order of naturalness in grasping in consideration of a distance between the object and the at least one joint unit and a rotation angle of the at least one joint unit.

The alignment unit may judge a grasp pose, having a shorter distance between the object and the at least one joint unit and a smaller rotation angle of the at least one joint unit, to represent more natural grasping of the object.

BRIEF DESCRIPTION OF THE DRAWINGS

These and/or other aspects of embodiments will become apparent and more readily appreciated from the following description of the embodiments, taken in conjunction with the accompanying drawings of which.

DETAILED DESCRIPTION

Figure 1:
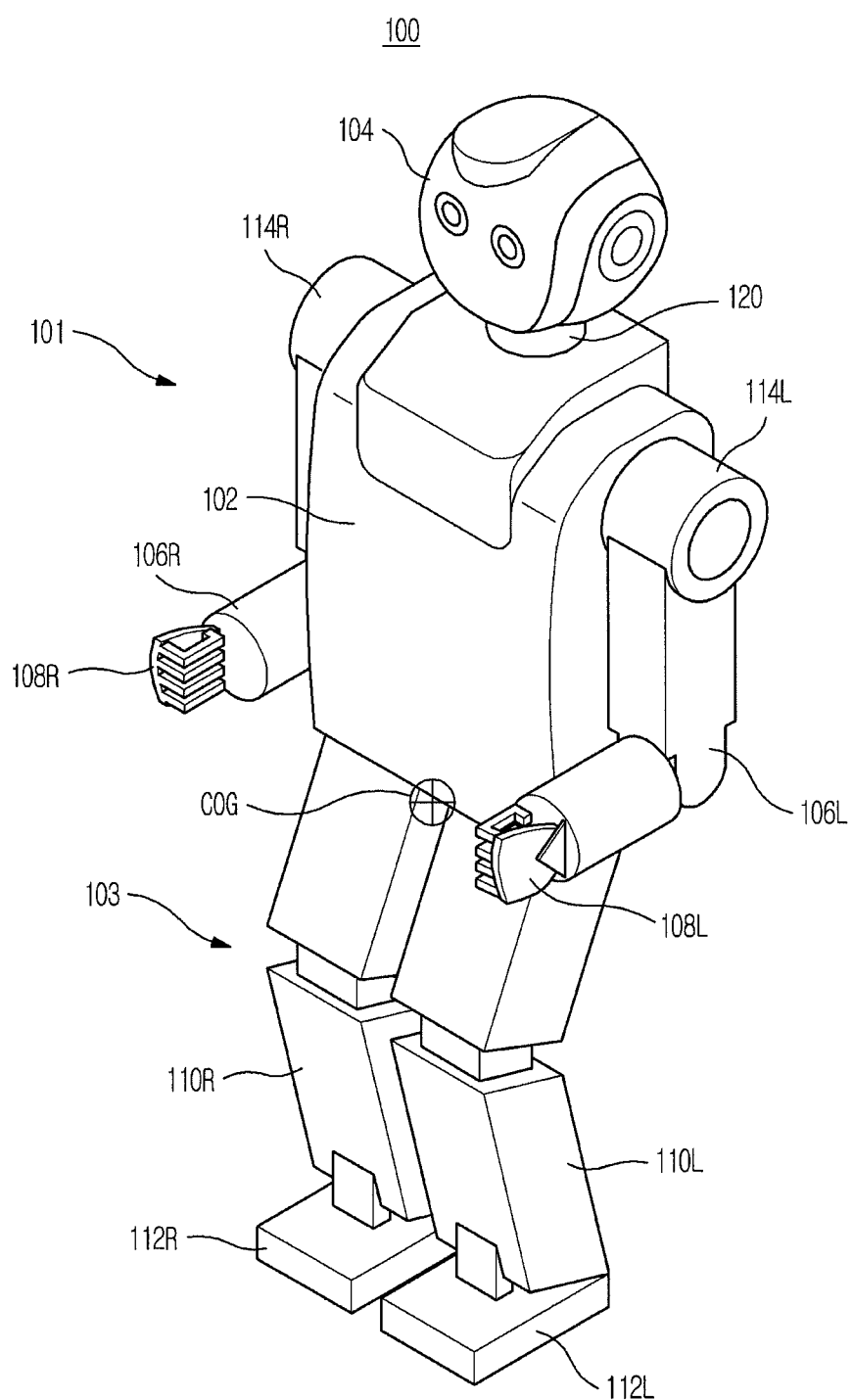
FIG. 1 is a view illustrating an external appearance of a robot in accordance with an embodiment.

Reference will now be made in detail to embodiments, examples of which are illustrated in the accompanying drawings, wherein like reference numerals refer to like elements throughout.

FIG. 1 is a view illustrating an external appearance of a robot in accordance with an embodiment.

As shown in FIG. 1, a robot 100 in accordance with an embodiment is a bipedal walking robot, which walks upright using two legs 110 in the same manner as a human, and includes an upper body 101 including a torso 102, a head 104, and arms 106, and a lower body 103 including the two legs 110.

The upper body 101 of the robot 100 includes the torso 102, the head 104 connected to the upper portion of the torso 102 through a neck 120, the two arms 106L and 106R connected to both sides of the upper portion of the torso 102 through shoulders 114L and 114R, and hands 108L and 108R respectively connected to tips of the two arms 106L and 106R.

The lower body 103 of the robot 100 includes the two legs 110L and 110R connected to both sides of the lower portion of the torso 102 of the upper body 101, and feet 112L and 112R respectively connected to tips of the two legs 110L and 110R.

Here, "R" and "L" respectively indicate the right and left sides of the robot 100, and COG indicates the center of gravity of the robot 100.

Figure 2:
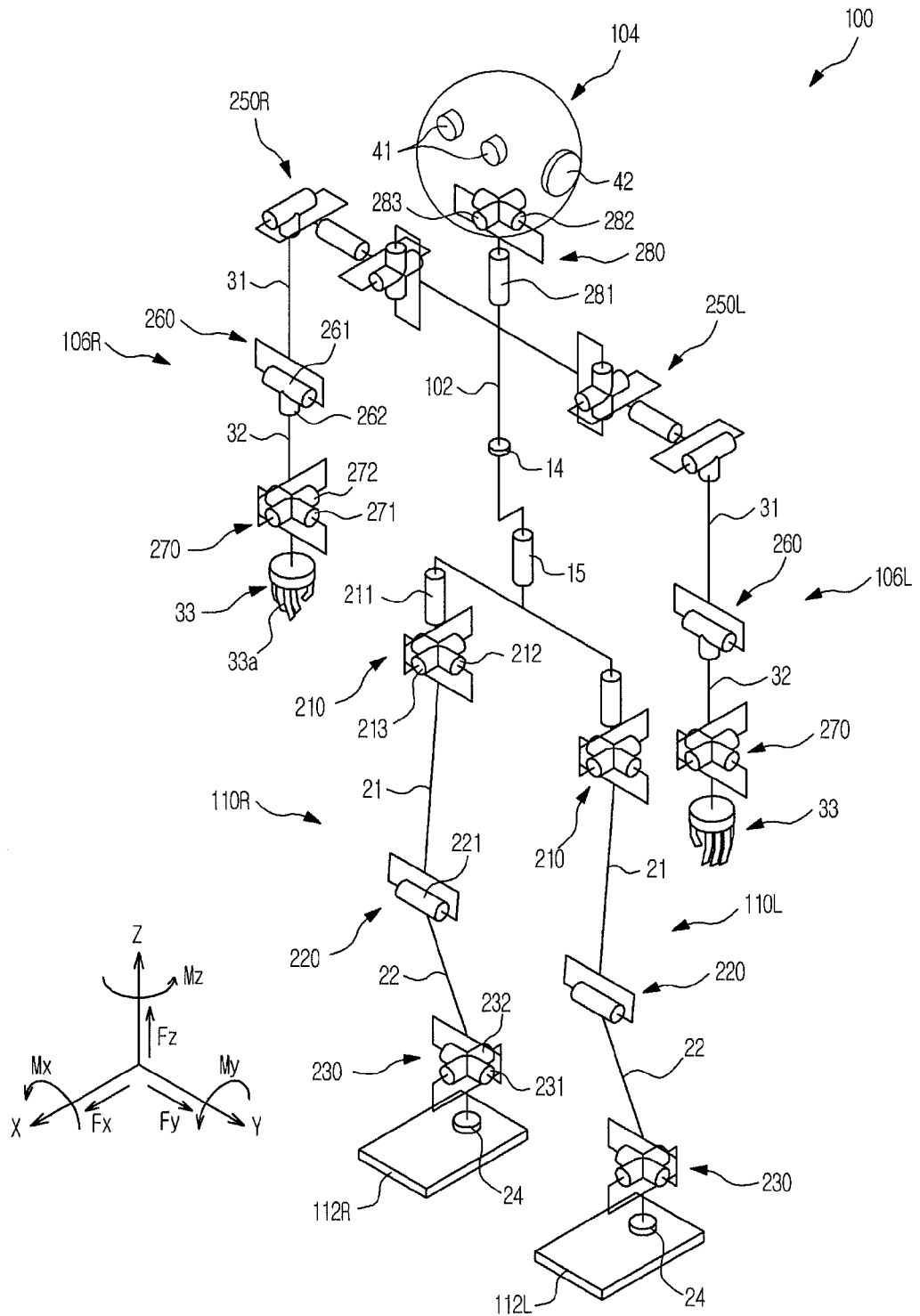
FIG. 2 is a view illustrating structures of main joints of the robot of FIG. 1.

FIG. 2 is a view illustrating structures of main joints of the robot of FIG. 1.

As shown in FIG. 2, a pose sensor 14 is installed on the torso 102 of the robot 100. The pose sensor 14 detects a tilt angle of the upper body 101, i.e., an inclination of the upper body 101 with respect to a vertical axis, and an angular velocity thereof, and then generates pose data. The pose sensor 14 may be installed on the two legs 110L and 110R as well as the torso 102.

A waist joint unit 15 having 1 degree of freedom in the yaw direction so as to rotate the torso 101 is installed on the torso 102.

Further, cameras 41 to capture surrounding images and microphones 42 to input user's voice are installed on the head 104 of the robot 100.

The head 104 is connected to the torso 102 of the upper body 101 through a neck joint unit 280. The neck joint unit 280 includes a rotary joint 281 in the yaw direction (rotated around the Z-axis), a rotary joint 282 in the pitch direction (rotated around the Y-axis), and a rotary joint 283 in the roll direction (rotated around the X-axis), and thus has 3 degrees of freedom.

Motors (for example, actuators, such as electric motors or hydraulic motors) to rotate the head 104 are connected to the respective rotary joints 281, 282, and 283 of the neck joint unit 280.

The two arms 106L and 106R of the robot 100 respectively have upper arm links 31, lower arm links 32, and the hands 108L and 108R.

The upper arm links 31 are connected to the upper body 101 through shoulder joint units 250L and 250R, the upper arm links 31 and the lower arm links 32 are connected to each other through elbow joint units 260, and the lower arm links 32 and the hands 108L and 108R are connected to each other by wrist joint units 270.

The shoulder joint units 250L and 250R are installed at both sides of the torso 102 of the upper body 101, and connect the two arms 106L and 106R to the torso 102 of the upper body 101.

Each elbow joint unit 260 has a rotary joint 261 in the pitch direction and a rotary joint 262 in the yaw direction, and thus has 2 degrees of freedom.

Each wrist joint unit 270 has a rotary joint 271 in the pitch direction and a rotary joint 272 in the roll direction, and thus has 2 degrees of freedom.

Each hand 108L or 108R is provided with five fingers 33a. A plurality of joints (not shown) driven by motors may be installed on the respective fingers 33a. The fingers 33a perform various motions, such as grasping of an article or pointing in a specific direction, in connection with movement of the arms 106.

The two legs 110L and 110R respectively have thigh links 21, calf links 22, and the feet 112L and 112R.

The thigh links 21 correspond to thighs of a human and are connected to the torso 102 of the upper body 101 through hip joint units 210, the thigh links 21 and the calf links 22 are connected to each other by knee joint units 220, and the calf links 22 and the feet 112L and 112R are connected to each other by ankle joint units 230.

Each hip joint unit 210 has a rotary joint (hip yaw joint) 211 in the yaw direction (rotated around the Z-axis), a rotary joint (hip pitch joint) 212 in the pitch direction (rotated around the Y-axis), and a rotary joint (hip roll joint) 213 in the roll direction (rotated around the X-axis), and thus has 3 degrees of freedom.

Each knee joint unit 220 has a rotary joint 221 in the pitch direction, and thus has 1 degree of freedom.

Each ankle joint unit 230 has a rotary joint 231 in the pitch direction and a rotary joint 232 in the roll direction, and thus has 2 degrees of freedom.

Since six rotary joints of the hip joint unit 210, the knee joint unit 220, and the ankle joint unit 230 are provided on each of the two legs 110L and 110R, a total of twelve rotary joints is provided to the two legs 110L and 110R.

Although not shown in the drawings, actuators, such as motors to drive the respective rotary joints, are installed on the robot 100. A grasp control unit to control a grasping operation of the robot 100 properly controls these motors, thereby achieving various grasping motions of the robot 100.

Figure 3:
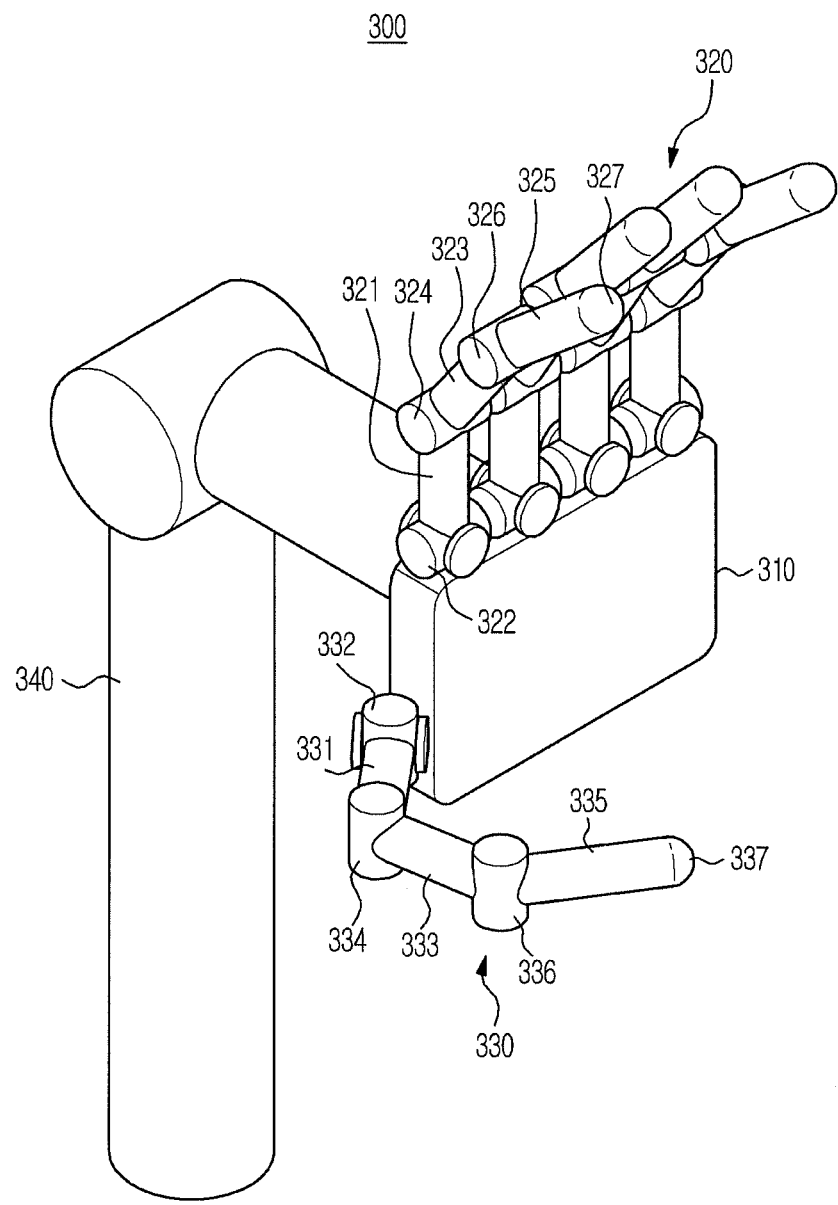
FIG. 3 is a perspective view illustrating a schematic configuration of a robot hand in accordance with an embodiment.

FIG. 3 is a perspective view illustrating a schematic configuration of a robot hand in accordance with an embodiment.

As shown in FIG. 3, a robot hand 300 in accordance with an embodiment includes a palm 310 and a plurality of fingers 320 and 330 connected to the palm 310. The palm 310 is connected to an arm 340 with at least 1 degree of freedom.

The plurality of fingers 320 and 330 includes a plurality of main grasp fingers (hereinafter, referred to as first fingers) 320 extended from the edge of one end of the palm 310 in the same direction and bent in the direction of the palm 310, and at least one sub-grasp finger (hereinafter, referred to as a second finger) 330 extended in a direction differing from the plurality of first fingers 320 and bent in the direction of the palm 310.

The plurality of first fingers 320 corresponds to a forefinger, a middle finger, a ring finger, and a little finger of a human hand, and the at least one second finger 330 corresponds to a thumb of the human hand. Each of the first fingers 320 and the second finger 330 includes a plurality of link members 321, 323, 325 or 331, 333, 335 and a plurality of joints 322, 324, 326 or 332, 334, 336 connecting the plural link members 321, 323, 325 or 331, 333, 335.

The plurality of link members 321, 323, 325 or 331, 333, 335 includes a first link member 321 or 331, a second link member 323 or 333, and a third link member 325 or 335, which are sequentially arranged close to the palm 310, and the plurality of joints 322, 324, 326 or 332, 334, 336 includes a first joint 322 or 332, a second joint 324 or 334, and a third joint 326 or 336, which are sequentially arranged close to the palm 310. The first joint 322 or 332 connects the palm 310 and the first link member 321 or 331, the second joint 324 or 334 connects the first link member 321 or 331 and the second link member 323 or 333, and the third joint 326 or 336 connects the second link member 323 or 333 and the third link member 325 or 335. Tips 327 of the third link members 325 and 335 correspond to tips of the respective fingers 320 and 330. Further, an encoder (not shown) to measure an angle between the neighboring link members 321, 323, 325, or 331, 333, 335 is installed at each of the plural joints 322, 324, 326, or 332, 334, 336.

Figure 4:
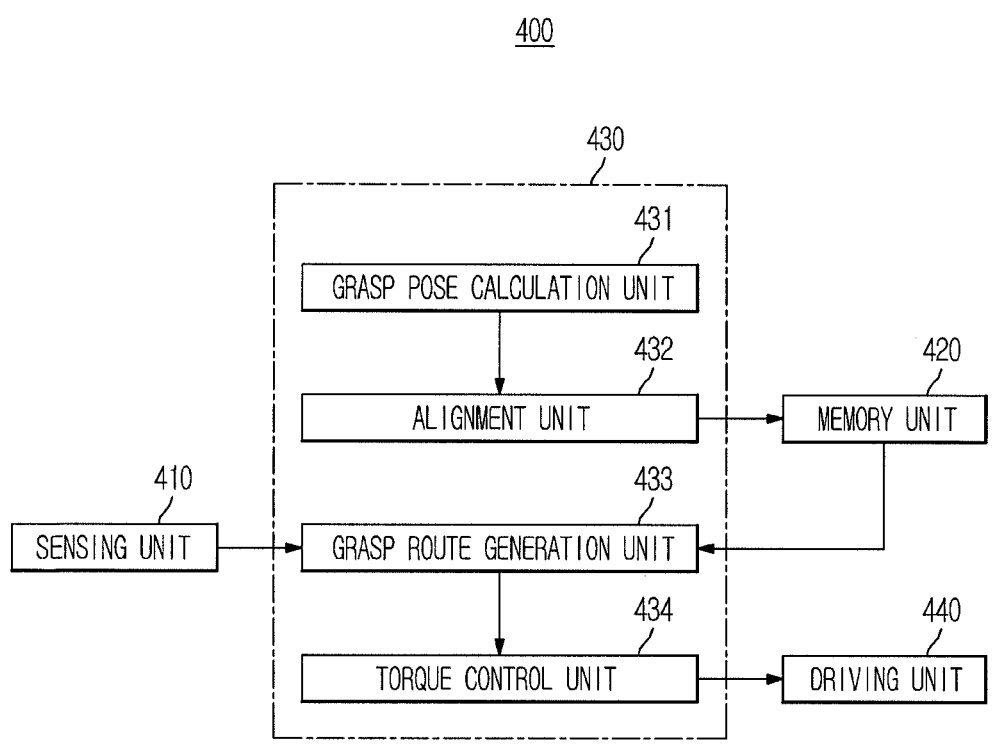
FIG. 4 is a grasp control block diagram of the robot in accordance with an embodiment.

FIG. 4 is a grasp control block diagram of the robot in accordance with an embodiment. The robot includes a sensing unit 410, a memory unit 420, a grasp pose calculation unit 431, an alignment unit 432, a grasp route generation unit 433, a torque control unit 434, and driving units 440.

The sensing unit 410 includes pose sensors installed on the torso of the robot to detect inclinations or poses of both arms and a sensor to recognize a target object, which is to be grasped. In this embodiment, the sensing unit 410 measures rotation angles of the shoulder joint units, the elbow joint units, the ankle joint units, and the plural joints constituting the hands of the robot. Further, the sensing unit 410 senses the object to be grasped and an orientation of the object, whether or not an obstacle is present around the object, and an orientation of the obstacle, and then transmits the sensed data to a grasp control unit 430.

The memory unit 420 stores grasp policies to calculate grasp poses and virtual orientation data of the object.

The grasp policy includes relative orientations of the robot hand and the object and data of the robot hand (right hand or left hand, i.e., any one of right and left hands) to grasp the object. That is, the grasp policy includes orientation data, such as which hand grasps the object and the orientation of the robot hand with respect to the grasp regions. Further, the grasp policy includes variation data, which correspond to parallel movable ranges of the robot hand in the directions of the x-axis, y-axis, and z-axis with respect to the object as well as the relative orientations of the robot hand the object.

For example, the memory unit 420 stores a grasp policy including orientation data in which the right hand of the robot is located on the y-axis with respect to the object and variation data in which the right hand moves from the orientation on the y-axis to the x-axis or the z-axis.

The virtual orientation data of the object means a plurality of orientation data randomly set along a movable route of the object. That is, the virtual orientation data of the object corresponds to a plurality of positions at which the object can be located.

The grasp pose calculation unit 431 calculates in advance grasp poses to grasp the object at virtual orientations P1, P2, . . . Pn while locating the object according to the virtual orientation data stored in the memory unit 420. Therefore, when grasping of the object by the robot hand is performed, grasp routes are generated using the grasp pose calculated in advance and thus grasping of the object by the robot hand may be rapidly achieved.

In more detail, the grasp pose calculation unit 431 locates the object at the plural virtual orientations P1, P2, . . . Pn in designated order using the virtual orientation data of the object stored in the memory unit 420.

Further, the grasp pose calculation unit 431 solves the Inverse kinematic equation to grasp the object at the virtual orientations P1, P2, . . . Pn using the grasp policies stored in the memory unit 420.

The Inverse kinematic equation is used to calculate rotation angles of the respective joint units constituting the robot arms, and the grasp poses of the robot arms are calculated through the Inverse kinematic equation. That is, the Inverse kinematic equation converts orientations of the object and the robot hand into coordinates in the world coordinate system using the grasp policies, and calculates rotation angles of the respective joint units constituting the robot arm based on the world coordinate system.

That is, the grasp pose calculation units 431 locates the object at the respective virtual orientations P1, P2, . . . Pn, and calculates rotation angles of the respective joint units by solving the Inverse kinematic equation at the virtual orientations P1, P2, . . . Pn. Further, the grasp pose calculation unit 431 calculates plural grasp poses to grasp the object at the virtual orientations P1, P2, . . . Pn using the calculated rotation angles of the respective joint units.

The grasp control unit 430 may include, or have operations performed by, a computer. For example, the grasp pose calculation unit 431, the alignment unit 432, the grasp route generation unit 433 and/or the torque control unit 434 may include, or have operations performed by, a computer. Similarly, the sensing unit 410, the memory unit 420 and/or the driving unit 440 may include, or have operations performed by, a computer.

Figure 5:
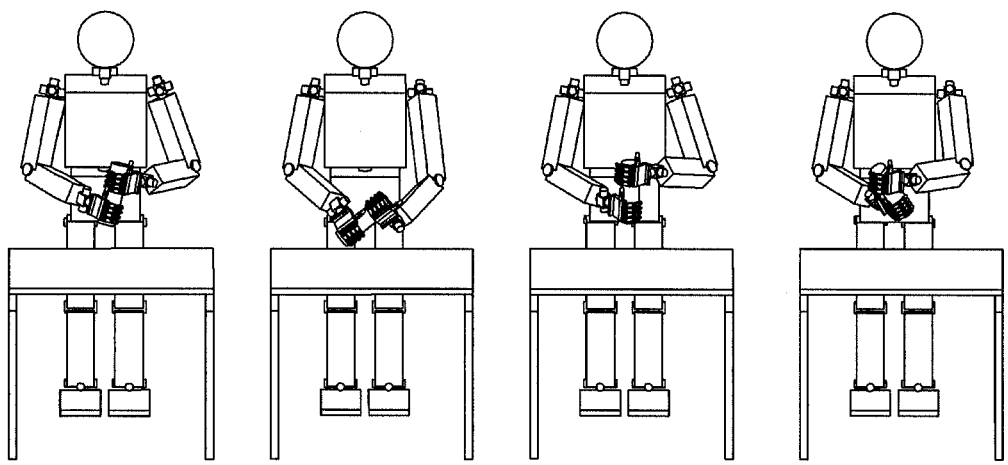
FIG. 5 is a view exemplarily illustrating grasp poses calculated by a grasp pose calculation unit of FIG. 4.

FIG. 5 is a view exemplarily illustrating grasp poses calculated by the grasp pose calculation unit of FIG. 4. With reference to FIG. 5, plural grasp poses of both arms of the robot to grasp the object located at any one of the virtual orientations P1, P2, . . . Pn are calculated.

The alignment unit 432 aligns the plural grasp poses calculated to grasp the object located at the respective virtual orientations P1, P2, . . . Pn, as shown in FIG. 5.

The grasp poses are aligned in order of naturalness in grasping. For this purpose, the alignment unit 432 aligns the grasp poses using a cost function, as stated in Expression 1 below.

$$f = c_1(|Object-Ls|+|Object-Rs|) + c_2(|\angle RW_1|+|\angle LW_1|) + c_3(|\angle RW_2|+|\angle LW_2|) + c_4(\Sigma|\angle J|)$$ [Expression 1]

In Expression 1, |Object−Ls| is a distance between an object and a left shoulder joint unit, and |Object−Rs| is a distance between the object and a right shoulder joint unit. $\angle RW_1$ means a rotation angle of a right wrist joint unit in the roll direction, $\angle LW_1$ means a rotation angle of a left wrist joint unit in the roll direction, $\angle RW_2$ means a rotation angle of the right wrist joint unit in the pitch direction, and $\angle LW_2$ means a rotation angle of the left wrist joint unit in the pitch direction. Further, $\angle J$ means rotation angles of other joint units, $c_1$, $c_2$, $c_3$, and $c_4$ are coefficients, and f is a result value corresponding to a naturalness score which is a measure of how human-like the grasping will appear.

From Expression 1, it is understood that naturalness of grasping of the object is determined by the distances between the object and the joint units of the robot arms and the rotation angles of the joint units.

In more detail, the alignment unit 432 judges a grasp pose, having shorter distances between the object and the right and left shoulder joint units and smaller rotation angles of the wrist joint units and other joint units, to be a grasp pose being capable of more naturally grasping the object. Here, other joint units mean shoulder joint units, elbow joint units, and plural joints constituting hands of the robot, i.e., the joint units constituting the robot arms.

Therefore, the alignment unit 432 judges a grasp pose, having smaller result value of the cost function corresponding to the naturalness score, to be a grasp pose being capable of more naturally grasping the object, and sets priority of the grasp pose to be high.

The alignment unit 432 transmits the grasp poses, the order of priority of which is set in such a manner, to the memory unit 420 such that a grasp pose database is formed in the memory unit 420.

When grasp routes are generated through alignment of the grasp poses by the alignment unit 432, the grasp pose being a high priority is first selected and thus natural grasping of the object is performed.

The grasp route generation unit 433 generates grasp routes using the grasp pose database stored in the memory unit 420.

In more detail, the grasp route generation unit 433 selects a grasp pose satisfying constraints from the grasp pose database based on a current state indicating orientations of the object sensed by the sensing unit 410, the joint units, the hands and an obstacle. The grasp route generation unit 433 selects the grasp pose in consideration of the constraints, i.e., movable angle ranges of the respective joint units, whether or not collision with the obstacle occurs, or self-collision between the robot hands.

When the grasp pose is selected, the grasp route generation unit 433 performs motion planning to generate grasp routes of the respective joint units using the selected grasp pose.

Thereby, compared with the conventional robot which calculates a grasp pose and generates grasp routes whenever grasping of an object is performed, the robot in accordance with an embodiment may rapidly and stably achieve grasping and regrasping of an object.

The torque control unit 434 calculates and controls torques of the respective joint units so as to cause the respective joint units of the robot to trace the grasp routes generated by the grasp route generation unit 423.

The driving units 440 transmit the control torques calculated by the torque control unit 434 to the respective joint units, and output torque control signals corresponding to the control torques, calculated to drive the actuators, such as the motors installed on the joint units, to the joint units.

In the conventional robot control method, orientations of an object, an obstacle, and a robot arm are detected by a sensing unit, a grasp pose is calculated by solving the Inverse kinematic equation to grasp the object, and grasp routes are generated based on the grasp pose, whenever the object is grasped. Therefore, if a solution to the Inverse kinematic equation is not present, it may take a long time to generate the grasp routes or grasping of the object may fail. Further, the process of aligning calculated grasp poses is not carried out, and thus unnatural grasping of the object may be performed.

On the other hand, in a robot control method in accordance with an embodiment, in order to solve the above problems of the conventional robot control method, grasp poses are calculated in advance, aligned, and stored so as to perform natural and rapid grasping. Hereinafter, this method will be described in detail with reference to FIGS. 6 and 7.

Figure 6:
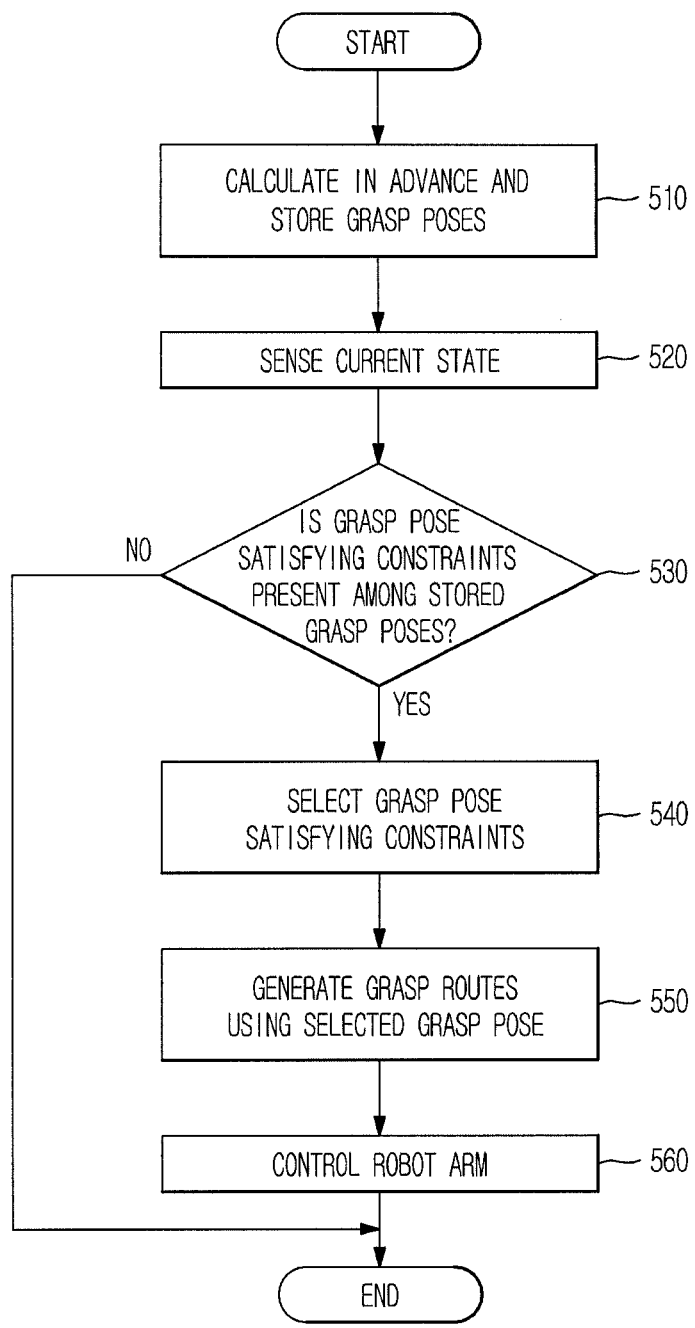
FIG. 6 is a flow chart illustrating a control method of a robot in accordance with an embodiment.

FIG. 6 is a flow chart illustrating a control method of a robot in accordance with an embodiment.

First, the grasp pose calculation unit calculates plural feasible grasp poses to grasp an object in advance, and then stores the calculated grasp poses in the memory unit (operation 510). A detailed method of calculating the plural grasp poses will be described with reference to FIG. 7.

The sensing unit senses a current state indicating orientation data of the object, a robot arm and an obstacle (operation 520). That is, the sensing unit senses respective states of the robot and the object, i.e., whether or not the obstacle is present and the orientation data of the object and the robot arm.

The grasp route generation unit selects a grasp pose satisfying constraints from among the plural grasp poses, stored in the memory unit, based on the sensed current state (operation 530 and operation 540). That is, the grasp route generation unit selects a proper grasp pose in consideration of movable angle ranges of the respective joint units, whether or not collision with the obstacle occurs, and self-collision between the robot hands. The respective joint units mean shoulder joint units, elbow joint units, ankle joint units, and plural joint units constituting robot arms.

Further, the grasp route generation unit repeats checking whether or not grasping of a target region of the object, which is predetermined by a user, is performed and selecting a grasp pose and generating grasp routes until grasping of the target region is performed. That is, the grasp route generation unit repeatedly generates grasp routes to grasp and regrasp the object so as to perform grasping of the target region.

Further, the grasp route generation unit generates grasp routes of the respective joint units using the selected grasp pose (operation 550). That is, a quadratic curve (IK-Bi-RRT) is generated using the selected grasp pose, and the quadratic curve provides a movement route of each joint unit.

The generated grasp routes are transmitted to the torque control unit such that torques of the respective joint units are controlled so as to trace the grasp routes (operation 560).

Figure 7:
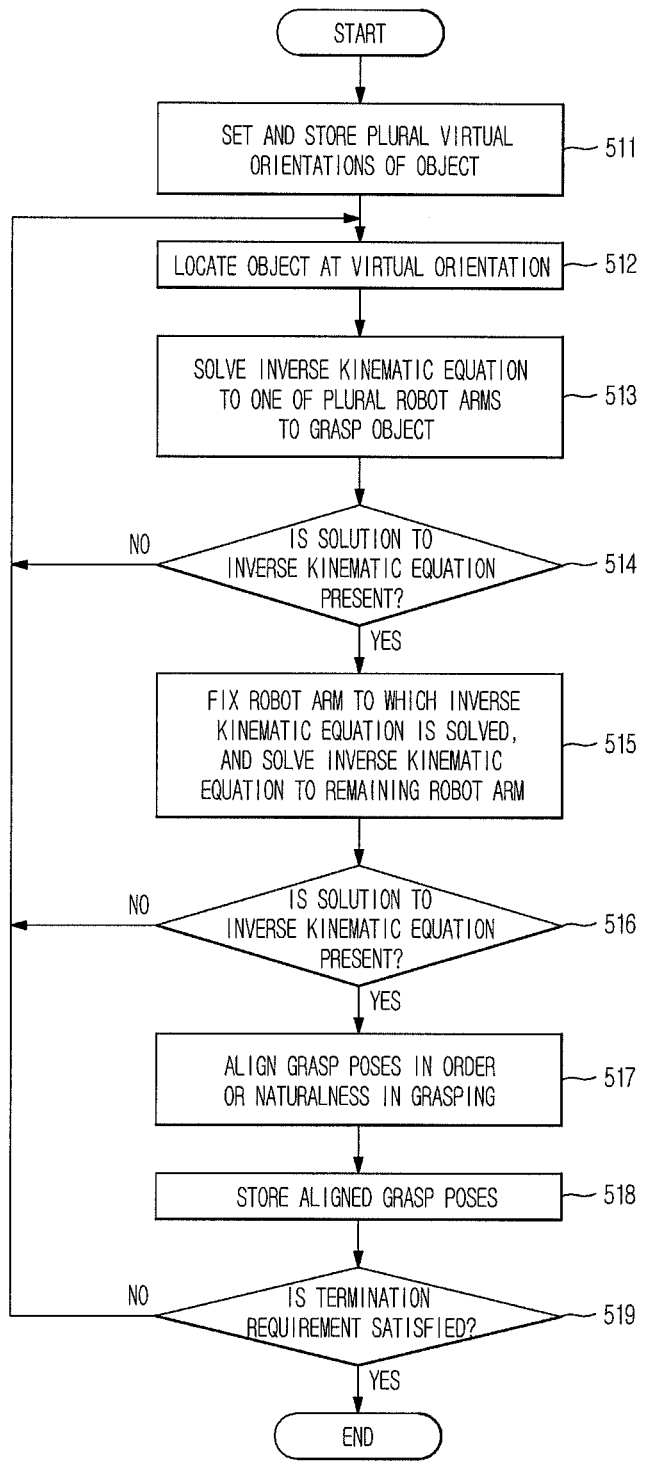
FIG. 7 is a flow chart illustrating a method of calculating grasp poses of FIG. 6 in more detail.

FIG. 7 is a flow chart illustrating a method of calculating the grasp poses of FIG. 6 in more detail.

First, plural virtual orientations at which an object may be located are set, and are stored as virtual orientation data in the memory unit (operation 511).

The grasp pose calculation unit locates the object at the virtual orientations $P_1, P_2, \ldots P_n$ in designated order according to the virtual orientation data (operation 512).

The grasp pose calculation unit calculates grasp poses to grasp the object at the virtual orientations $P_1, P_2, \ldots P_n$ while moving the object from the current orientation to the virtual orientations $P_1, P_2, \ldots P_n$.

That is, the grasp pose calculation unit locates the object at the respective virtual orientations $P_1, P_2, \ldots P_n$ (operation 512), and calculates rotation angles of the respective joint units by solving the Inverse kinematic equation at the virtual orientations $P_1, P_2, \ldots P_n$. Further, the grasp pose calculation unit calculates the plural grasp poses using the calculated rotation angles of the joint units.

In more detail, the grasp pose calculation unit selects one virtual position (assume this is $P_1$) from among the virtual orientations $P_1, P_2, \ldots P_n$ (operation 512), and solves the Inverse kinematic equation to one of the plural robot arms to grasp the object located at the selected virtual position $P_1$ (operation 513). When a solution to the Inverse kinematic equation to the robot arm is present (operation 514), the robot arm is fixed, and the grasp pose calculation unit solves the Inverse kinematic equation to the remaining robot arm (operation 515).

Therefore, grasp poses of both arms to grasp the object located at the respective virtual orientations P1, P2, . . . Pn are calculated. Further, the solutions to the Inverse kinematic equation to both arms are independently calculated, and thus effective manipulation of both arms is performed.

Further, as a result of the solving of the Inverse kinematic solution, when a solution to the Inverse kinematic equation to one of the robot arms is not present (operation 514 and operation 516), the grasp pose calculation unit selects another virtual position P2 from among the virtual orientations P1, P2, . . . Pn (operation 512), and again solves the Inverse kinematic equation to one of the plural robot arms to grasp the object located at the selected virtual position P2 (operation 513 and operation 515).

The calculated plural grasp poses are aligned in order of naturalness in grasping by the alignment unit (operation 517). The plural grasp poses, aligned in such a manner, of the respective virtual orientations P1, P2, . . . Pn are stored in the memory unit (operation 518).

The alignment unit judges a grasp pose, having shorter distances between the object and the shoulder joint units and smaller rotation angles of respective joint units, to be a grasp pose being capable of more naturally grasping the object, and aligns the calculated grasp poses in this order (operation 517).

Further, if grasping of the target region of the object is not achieved and thus regrasping of the object is performed, the alignment unit again aligns the grasp poses based on the sensed orientation of the object. In more detail, if regrasping of the object is performed, the alignment unit re-aligns the grasp poses, stored in the memory unit, based on a distance between the current orientation of the object and the virtual orientation. That is, the alignment unit judges a grasp pose, aligned already and having a shorter distance between the current orientation and the virtual orientation, to be a grasp pose being capable of more naturally grasp the object, and the grasp poses are again aligned in this order.

When the grasp poses are stored in the memory unit (operation 518), the grasp pose calculation unit judges whether or not a termination requirement of intermediate grasp calculation is satisfied (operation 519). As a result of the judgment, if it is judged that the termination requirement is not satisfied, the grasp pose calculation unit locates the object to another virtual orientation, and then calculates grasp poses of the object at the virtual orientation.

Here, whether or not the termination requirement is satisfied is determined by whether or not calculation of the grasp poses exceeds a predetermined time, whether or not the grasp poses are sufficiently calculated, and whether or not the grasp poses at all the virtual orientations are calculated.

That is, the grasp pose calculation unit calculates grasp poses for a designated time and stores the grasp poses, and terminates grasp pose calculation when the number of the calculated grasp poses reaches a predetermined critical value. Further, the grasp pose calculation unit terminates grasp pose calculation when grasp poses of the object at all the virtual orientations P1, P2, . . . Pn are calculated.

In the robot control method, as shown in FIGS. 6 and 7, feasible grasp poses are calculated in advance by solving the Inverse kinematic equation and are stored, thereby shortening a time to generate grasp routes. Further, the calculated grasp poses are aligned in designated order and stored, thereby achieving natural grasping of the object.

As is apparent from the above description, in a robot and a control method thereof in accordance with an embodiment, grasp poses are calculated in advance by solving the Inverse kinematic equation and are stored, thereby shortening a time to generate grasp routes. That is, a proper grasp pose is selected from among the grasp poses stored in advance and grasp routes are generated based on the selected grasp pose, thereby rapidly and stably generating the grasp routes, compared with the conventional robot control method in which a grasp pose is calculated whenever grasp routes are generated.

Further, the calculated grasp poses are aligned in order of naturalness in grasping, thereby achieving natural grasping of an object.

According to at least one embodiment, a respective grasp pose of a plurality of calculated grasp poses is selected for an object to be grasped by a robot, and a grasp route is generated for the selected grasp pose. The robot is controlled to trace the generated grasp route to thereby grasp the object with the selected grasp pose. For example, at least one robot arm is controlled to trace a generated grasp route to thereby grasp the object with a selected grasp pose.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A control method of a robot with a plurality of robot arms, each of which has at least one joint unit and a hand, the control method comprising:

calculating, in advance, a plurality of grasp poses at each of a plurality of predetermined virtual positions of an object to be grasped, and storing the calculated plurality of grasp poses, the predetermined virtual positions being a plurality of position data set along a movable route of the object;

sensing respective orientations of the object to be grasped, the plurality of robot arms, and an obstacle;

selecting a grasp pose from among the stored plurality of grasp poses by judging a movable angle range of the at least one joint unit, whether or not the object collides with the obstacle, and self-collision between the robot hands based on the sensed respective orientations; and generating grasp routes using the selected grasp pose;

controlling the robot to trace a respective grasp route of the generated grasp routes to thereby grasp the object by the robot with the selected grasp pose;

wherein the calculating and storing the plurality of grasp poses includes:

placing the object at the plurality of predetermined virtual positions;

calculating the plurality of grasp poses at each of the plurality of predetermined virtual positions by calculating solutions to an Inverse kinematic equation to the plurality of robot arms to grasp the object located at the predetermined virtual positions; and aligning the plurality of Calculated grasp poses in order of naturalness in grasping;

wherein, in the alignment of the plurality of calculated grasp poses, the plurality of calculated grasp poses is aligned in order of naturalness in grasping in consideration of a distance between the object and the at least one joint unit and a rotation angle of the at least one joint unit.

2. The control method according to claim 1, wherein the calculation of the plurality of grasp poses includes: calculating a solution to the Inverse kinematic equation to one robot arm among the plurality of robot arms; and fixing the one robot arm and calculating a solution to the Inverse kinematic equation to the remaining robot arm, after the calculation of the solution to the Inverse kinematic equation to the one robot arm.

3. The control method according to claim 1, wherein a grasp pose, having a shorter distance between the object and the at least one joint unit and a smaller rotation angle of the at least one joint unit, is judged to represent more natural grasping of the object.

4. The control method according to claim 1, wherein at least one of said calculating, said sensing, said selecting and said generating are performed by a computer.

5. A robot with a plurality of robot arms, each of which has at least one joint unit and a hand, comprising a memory unit to set and to store a plurality of predetermined virtual positions of an object to be grasped, the predetermined virtual positions being a plurality of position data set along a movable route of the object;

a grasp pose calculation unit to calculate in advance and to store a plurality of grasp poses at each of the plurality of predetermined virtual positions stored in the memory unit;

an alignment unit to align the plurality of grasp poses calculated by the grasp pose calculation unit in order of naturalness in grasping and to store the plurality of aligned grasp poses in the memory unit;

a sensing unit to sense respective orientations of the object, the plurality of robot arms, and an obstacle; and a grasp route generation unit to select a grasp pose from among the plurality of aligned grasp poses by judging a movable angle range of the at least one joint unit, whether or not the object collides with the obstacle and self-collision between the robot hands based on the sensed respective orientations, and to generate grasp routes using the selected grasp pose, wherein the alignment unit aligns the plurality of grasp poses in order of naturalness in grasping in consideration of a distance between the object and the at least one joint unit and a rotation angle of the at least one joint unit.

6. The robot according to claim 5, wherein the grasp pose calculation unit places the object at the plurality of predetermined virtual positions, and calculates the plurality of grasp poses at each of the plurality of predetermined virtual positions by calculating solutions to an Inverse kinematic equation to the plurality of robot arms to grasp the object located at the predetermined virtual positions.

7. The robot according to claim 6, wherein the grasp pose calculation unit calculates a solution to the Inverse kinematic equation to one robot arm among the plurality of robot arms, and fixes the one robot arm and calculates a solution to the Inverse kinematic equation to the remaining robot arm, after the calculation of the solution to the Inverse kinematic equation to the one robot arm.

8. The robot according to claim 5, wherein the alignment unit judges a grasp pose, having a shorter distance between the object and the at least one joint unit and a smaller rotation angle of the at least one joint unit, to represent more natural grasping of the object.

* * * * *